Aug. 17, 1937.  C. R. PATON  2,090,459
MOTOR VEHCLE
Filed Sept. 9, 1931
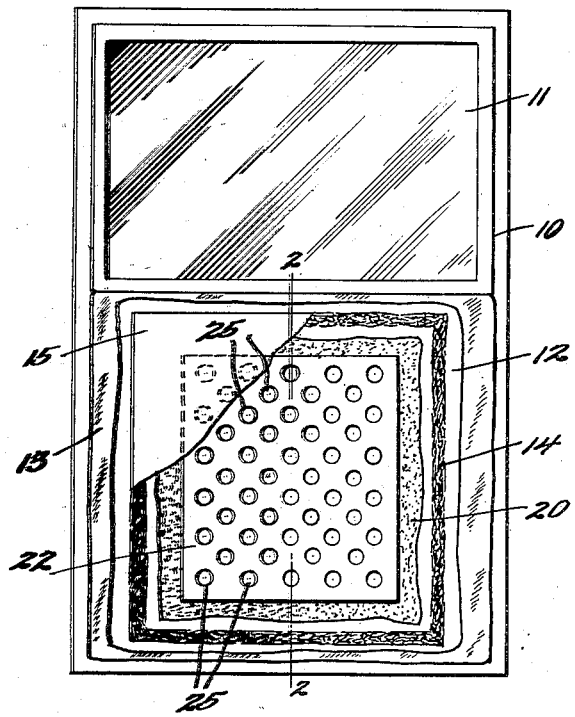
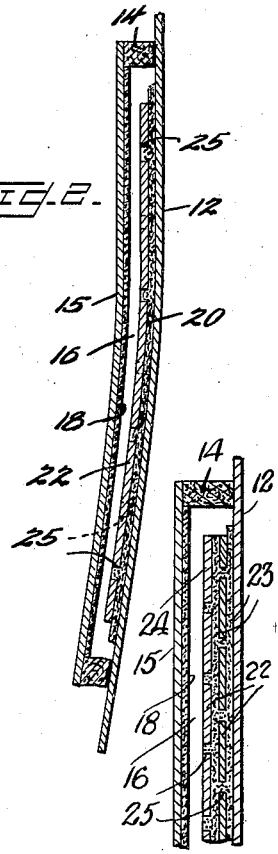
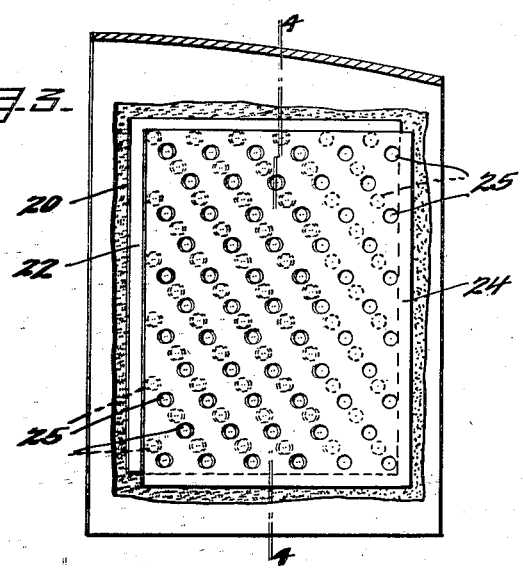
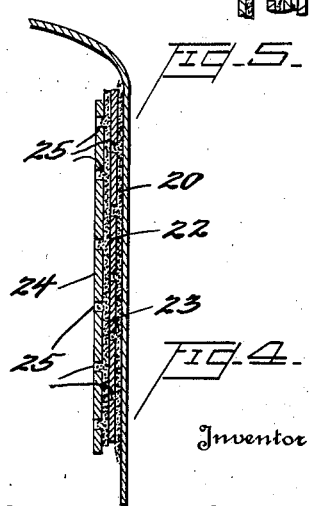

Patented Aug. 17, 1937

2,090,459

UNITED STATES PATENT OFFICE 2,090,459

MOTOR VEHICLE

Clyde R. Paton, Birmingham, Mich., assignor, by mesne assignments, to The Upson Company, Lockport, N. Y., a corporation of New York Application September 9, 1931, Serial No. 561,959

15 Claims. (Cl. 296—31)

This invention relates to improvements in the damping of vibrations in motor vehicle bodies, and is more particularly concerned with the provision of means for eliminating vibrations in the various metal panels which constitute the sides and rear of the vehicle body. These vibrations are due to various causes incident to the operation of motor vehicles but result primarily from the torque impulses developed in the vehicle motor.

It is one object of the invention to eliminate objectionable noise resulting from body vibrations by providing a dead air space between the vehicle body panels and the interior of the vehicle, and particularly adjacent the central portions of the panels, at which point the vibrations are of the greatest amplitude and therefore most objectionable.

It is a further object of the invention to prevent the development of serious vibrations by the provision of means for absorbing the energy of the vibrations. Thus the provision of sound insulation such as is afforded by means preventing the transmission of the panel vibrations to the surrounding air and thereby to the interior of the vehicle does not prevent the transmission of these vibrations to other portions of the vehicle through the panels and body members themselves with the resultant development of noise at other portions of the vehicle than those portions which are so insulated.

It has heretofore been proposed to provide a relatively thick adhesive coating on the interior surfaces of the body panels in order to deaden the sound and reduce vibration, but the principal effect of such a coating, whether used alone or in conjunction with a covering of soft material such as felt, is simply to load the panel and thus alter the natural period of vibration thereof so as to render the panel less reponsive to vibration frequencies within the range of frequencies normally developed during operation of the motor. By thus loading a panel the higher frequencies of vibration can be eliminated to some extent but it is not possible to eliminate vibrations of lower frequency.

The present invention therefore contemplates the application to the panel of means which will develop friction on the occurrence of vibrations in the panel so that the energy of these vibrations is absorbed and the vibrations are eliminated at their source, that is to say, before these vibrations have been communicated to the surrounding air.

It is thus a further object of the invention to provide means for absorbing the energy of vibration of the various portions of the body of a vehicle and to prevent transmission of such vibrations as are not thus absorbed to the air within the vehicle body.

Further objects of the invention will be apparent from the following description taken in connection with the accompanying drawing, in which:

Figure 1 is an elevation of the interior of a motor vehicle door illustrating one form of application of the principles of the present invention;

Figure 2 is a sectional view on the line 2—2 of Figure 1;

Figure 3 is a rear elevation of a vehicle panel illustrating a modification of the invention;

Figure 4 is a sectional view on the line 4—4 of Figure 3; and

Figure 5 is a fragmentary sectional view corresponding to Figure 1 and illustrating the employment of vibration damping means similar to that shown in Figure 4.

Referring now specifically to the drawing, it will be observed that Figure 1 discloses a conventional vehicle door including a frame 10, window 11, an outer metal panel 12 and an inner fabric covering 13, the latter being broken away to expose the inner face of the panel. Secured by adhesive to the inner face of the panel 12 is a strip of soft fibrous material 14, for instance felt, this strip being arranged as shown to enclose a considerable portion of the panel face. In the drawing the fibrous strip is arranged in the form of a rectangle but it will be appreciated that any closed figure surrounding a considerable area including the central portion of the panel will suffice. A sound insulating board 15, of any material suitable for the purpose, for instance fiber or stiff cardboard, is secured by adhesive to the felt strip and is of such configuration as to overlie this strip to form with the strip a chamber 16 providing a dead air space between the board 15 and the panel 12. It is sometimes found desirable to secure a layer of felt or other sound absorbent material 18 by adhesive to the enclosed face of the board 15 to further increase the efficiency of the board in preventing the transmission of sound vibrations which may be communicated to the air within the chamber 16.

As pointed out hereinbefore, vibrations of an amplitude sufficient to become disturbing are induced principally in the central portion of the panel and the arrangement just described effectively prevents the communication of sound vibrations directly to the interior of the body.

These vibrations are, however, transmitted to a lesser extent through the panel itself to the outer portions thereof which do not lie within the enclosure formed by the felt strip 14 and vibrations may also be transmitted to the frame and other portions of the vehicle body and may eventually result in the development of objectionable noise within the vehicle. Furthermore, although the provision of the dead air space adjacent the panel substantially eliminates the transmission of vibrations from the central portion of the panel to the air within the vehicle, under some conditions these vibrations may be communicated to a small extent to the vehicle interior through the air space and the sound insulating board.

It is thus desirable to prevent the development of serious vibrations in the panel and for this purpose a fairly thick coating of imperfectly elastic, plastic or semi-plastic material 20 is applied to the inner face of the panel 12 and a sheet 22 of relatively stiff material, for instance cardboard, is applied against this coating. The material of which the coating 20 is formed preferably consists of an asphaltic base to which have been added softening and thinning agents, and may be described generally as an asphaltic cement. The exact composition of this material is not of importance and numerous substances are suitable for the purpose, it being only necessary that the material shall remain in a plastic or semi-plastic condition or shall be imperfectly elastic. Preferably the thinning agent should be present initially in such amount as to facilitate the application of the material by means of a brush or the like, the applied material hardening or setting to the degree of plasticity required to absorb the energy of the vibrations within a fairly short time after application thereof. In order to distinguish this material from ordinary cements which are adapted to set or harden after a brief period of time and which would thus not function properly to absorb the energy of vibrations in the manner described herein, the term "plastic or semi-plastic" as referred to the material in question is intended to describe a more or less permanent condition of the material. It is of course sufficient that the material remain plastic during the normal life of the vehicle although it is not desired to exclude materials which will function properly over a considerable period of time, for instance a year or more. Similarly the sheet or board 22 may be formed of any material offering resistance to flexure and relatively stiff in the direction of its length and width, many substances of fibrous nature such as wood or wall board being found satisfactory.

It will be seen that when vibrations are developed in the panel, relative motion of the panel and sheet 22 between the opposed faces of the panel and sheet in the direction of the longer dimensions thereof result, this relative motion being greater if the panel is curved as are most of the panels in a vehicle body. Since the panel 12 and the sheet 22 are separated by the layer of plastic or imperfectly elastic material, this material will be deformed to a considerable extent by the relative movement of the panel and sheet, the extent of deformation being greater the thinner the coating 20. Since the coating 20 is of such nature as to permit this deformation and yet to offer resistance thereto, it is apparent that the energy of the vibrations will be absorbed to a considerable extent, being converted into heat energy by reason of the internal frictional resistance or hysteresis of the coating 20.

It can be shown that certain vehicle panels, for instance the side panels of the cowl, are subjected to forces tending to set them in vibration to a much greater extent than are other panels more remote from the motor which is the source of disturbance. On these cowl panels it is found particularly desirable to materially increase the damping effect to compensate for the increased amplitude of the vibrations developed therein and for this purpose the modified arrangement shown in Figures 3 and 4 is found satisfactory. A coating 20 and sheet 22 are first applied to the panel, as hereinbefore described, and the exposed face of the sheet 22 is coated as indicated at 23 with a material having properties similar to those exhibited by the coating 20. A second sheet or board 24 of similar nature to the board 22 is then applied against the coating 23. When vibrations develop in the panel their energy is absorbed not only by the coating 20 but by the second coating 23 since relative movement of the panel 12, the sheet 22 and sheet 23 results from the flexing of the panel in response to the induced vibrations. If it is found that the damping is still insufficient to eliminate vibrations in the panel the number of sheets may be further increased until the desired result is obtained.

It is highly desirable that the plastic or semi-plastic material 20 should exhibit adhesive properties so that the sheet 22 may be positioned permanently by the simple expedient of pressing the sheet against the coating 20. This property is exhibited by numerous materials of a semi-plastic nature, for instance the substances having the asphaltic base hereinbefore mentioned.

It will be noted that the sheets or boards 22 and 24 are provided with apertures 25, the reason for this construction being two-fold. In the first place, the coating substance 20 tends to flow within or through these apertures and to thus increase the bond between the coating material and the perforated sheet. In the second place, it is essential that the formation of air pockets between the sheet 22 and the coating 20 be avoided since the presence of such air pockets reduces the adhesion of the coating with the sheet and prevents the absorption of the maximum amount of energy since portions of the coating will not be deformed when vibrations occur. The apertures 25 thus make it possible to quickly and permanently position the sheet, any air which would otherwise be entrapped when the sheet is laid on the plastic coating passing out through the perforations in the sheet. Furthermore, the workmen applying the material to the panel can readily ascertain by observing the extent of flow of the material through different apertures 25 whether the sheet has been firmly pressed against the coating 20 over its entire surface.

It is of course feasible to employ in the combination shown in Figure 2 more than one sheet of stiff material if necessary to properly damp vibrations, the plastic or semi-plastic material 20 being applied between the first sheet and the panel and between the successive sheets as shown in Figure 4. This arrangement is illustrated in Figure 5 of the drawing in which two of the stiff sheets 22 and 24 are shown, the remaining reference characters corresponding to those employed in Figure 2 and designating similar parts.

It will be understood that under some conditions the application of the felt strip 14 and the sound insulating board 15 will be sufficient to eliminate objectionable noise within the body or that the application of the coating material and one or more of the sheets 22, 24 will damp vibrations arising in the panel to a sufficient extent to make it unnecessary to provide a dead air space, in which event the complete elimination of vibrations by the provision of the combination shown in Figures 1 and 2 will not be necessary. Obviously, various further alterations in the materials used and in their disposition with respect to each other and to the panel may be made without departing from the spirit of the invention as defined in the appended claims.

Having thus described the invention, what is claimed as new and desired to be secured by Letters Patent is:

1. In a motor vehicle, the combination with a vehicle body panel, of a strip of soft material secured to the inner face of said body panel and forming a closed figure surrounding a portion of said panel face, a sheet of relatively stiff material overlying and secured to said strip to form a dead air space over the said panel face, a sheet of relatively stiff material disposed within said dead air space in close proximity to said panel and a layer of plastic material interposed between and contacting with said panel and said sheet, whereby vibrations arising in said panel will produce relative movement of said sheet and panel to deform said layer of plastic material and thereby dissipate the energy of vibration.

2. In a motor vehicle, the combination with a vehicle body panel, of a strip of soft material secured to the inner face of said body panel and forming a closed figure surrounding a portion of said panel face, a sheet of relatively stiff material overlying and secured to said strip to form a dead air space over the said panel face, a sheet of relatively stiff material disposed within said dead air space in close proximity to said panel, a layer of plastic material interposed between and contacting with said panel and said sheet, whereby vibrations arising in said panel will produce relative movement of said sheet and panel to deform said layer of plastic material and thereby dissipate the energy of vibration, a second sheet of relatively stiff material superposed on said first sheet, and a layer of imperfectly elastic material interposed between said sheets.

3. In a motor vehicle, the combination with a vehicle body panel, of a strip of felt secured by adhesive to the inner face of said body panel and surrounding a portion of the panel face, a sheet of relatively stiff fibrous material overlying said strip and secured thereto by adhesive, an asphaltic cement layer forming a coating on a portion of the surrounded face of said panel, and a sheet of relatively stiff fibrous material overlying and contacting with said cement coating.

4. In a motor vehicle, the combination with a vehicle body panel, of a strip of felt secured by adhesive to the inner face of said body panel and surrounding a portion of the panel face, a sheet of relatively stiff fibrous material overlying said strip and secured thereto by adhesive, an asphaltic cement layer forming a coating on a portion of the surrounded face of said panel, and a sheet of relatively stiff fibrous material overlying and contacting with said cement coating, said last named sheet having apertures therein for the purpose described.

5. Means for damping vibrations in a vehicle body member comprising a sheet of relatively stiff material overlying a portion of one face of said member, and a layer of plastic material interposed between and contacting with said member and said sheet, the stiffness of the sheet in a plane parallel to the face of the member being sufficient to ensure that vibrations arising in said member will produce relative movement of said sheet and member to deform said layer of plastic material and thereby dissipate the energy of vibration.

6. Means for damping vibrations in a vehicle body member comprising a layer of imperfectly elastic material covering a portion of the surface of said member, and a sheet of relatively stiff material contacting with said layer, said sheet having a plurality of apertures therein to prevent the formation of air pockets between the sheet and the layer of material, the stiffness of said sheet in a plane parallel to the surface of the member being sufficient to ensure that vibrations arising in said member will produce relative movement of said sheet and member to deform the layer of imperfectly elastic material and thereby dissipate the energy of vibration.

7. Means for damping vibrations in a vehicle body member comprising a layer of imperfectly elastic material having an asphaltic base covering a portion of the surface of said member, and a sheet of relatively stiff material contacting with said layer, said sheet having a plurality of apertures therein to prevent the formation of air pockets between the sheet and the layer of material, the stiffness of said sheet in a plane parallel to the surface of the member being sufficient to ensure that vibrations arising in said member will produce relative movement of said sheet and member to deform the layer of imperfectly elastic material and thereby dissipate the energy of vibration.

8. Means for damping vibrations in a vehicle body member comprising a layer of imperfectly elastic material covering a portion of the surface of said member, and a sheet of relatively stiff material contacting with said layer, said sheet having a plurality of apertures therein to prevent the formation of air pockets between the sheet and the layer of material, a second sheet of relatively stiff material superposed on said first sheet, and a layer of imperfectly elastic material interposed between said sheets, the stiffness of said sheets in planes parallel to the surface of the member being sufficient to ensure that vibrations arising in said member will produce relative movement of said sheets and member to deform said layers of material and thereby dissipate the energy of vibration.

9. Means for damping vibrations in a vehicle body member comprising a layer of imperfectly elastic material covering a portion of the surface of said member, and a sheet of relatively stiff material contacting with said layer, said sheet having a plurality of apertures therein to prevent the formation of air pockets between the sheet and the layer of material, a second sheet of relatively stiff material superposed on said first sheet, said second sheet having perforations therein offset with respect to the perforations in said first sheet, and a layer of plastic material interposed between said sheets, the stiffness of said sheets in planes parallel to the surface of the member being sufficient to ensure that vibrations arising in said member will produce relative movement of said sheets and member to deform said layers of material and thereby dissipate the energy of vibration.

10. Means for eliminating noise resulting from vibrations induced in a vehicle body member comprising a strip of soft material secured to said member and surrounding a portion of the surface thereof, and a sheet of material secured to said strip and overlying the said surface of the member to form a dead air space over such surface, said strip forming the sole support for said sheet.

11. Means for damping vibrations in a member subject to vibration, said means comprising a layer of self-sustaining sheet material of substantial area overlying a portion of one face of said member, and a layer of substantially permanently semi-plastic and imperfectly elastic material interposed between said member and said sheet material and connected to both of them, said semi-plastic layer being deformed in a direction approximately parallel to said member by vibration of said member and serving to dissipate part of the energy of vibration due to its semi-plastic and imperfectly elastic character.

12. A construction as described in claim 11, in which said semi-plastic layer is an adhesive with an asphaltic base.

13. Means for damping vibrations in a member subject to vibration, said means comprising a layer of substantially permanently semi-plastic and imperfectly elastic material overlying a substantial area of a surface of said member, and a layer of sheet material applied over a substantial area of said semi-plastic layer and secured thereto throughout the major part of their common overlying areas, said semi-plastic layer offering substantial resistance to deformation by secondary forces acting approximately parallel to said surface of said member, said sheet material being so designed and proportioned relatively to said semi-plastic layer as to offer greater resistance to deformation by such forces than the resistance offered by said semi-plastic layer, so that when said member vibrates, said deformation of said two layers by said secondary forces will tend to occur to a greater extent in said semi-plastic layer than in said sheet material.

14. Means for damping vibrations in a member subject to vibration, said means comprising a layer of substantial thickness of substantially permanently semi-plastic and imperfectly elastic material having substantial adhesive properties on a surface of said member, said semi-plastic layer offering substantial resistance to deformation in a direction approximately parallel to said surface of said member, and a layer of sheet material adhered to said adhesive layer and spaced thereby from said member, said sheet material having substantial resistance to compression and elongation in a direction approximately parallel to the surface of said member to which said semi-plastic layer is applied, so that vibration of said member will tend to cause slippage of said sheet material over said surface of said member to cause deformation of said semi-plastic material, such deformation absorbing part of the energy of vibration.

15. Means for damping vibrations in a member subject to vibration, said means comprising a layer of substantially permanently semi-plastic and imperfectly elastic material on a substantial area of a surface of said member, said semi-plastic layer offering substantial resistance to deformation in a direction approximately parallel to said surface of said member, and a layer of sheet material applied to said first mentioned layer and spaced thereby from said member, said sheet material offering substantial resistance to compression and elongation in a direction approximately parallel to the surface of said member to which said semi-plastic layer is applied and having a series of cavities into at least some of which said semi-plastic layer extends at least partially to interlock said sheet material more firmly with said semi-plastic layer.

CLYDE R. PATON.